United States Patent [19]

Wang

[11] Patent Number: 5,700,062
[45] Date of Patent: Dec. 23, 1997

[54] WHEEL COVER ADJUSTABLE IN ITS SIZE

[76] Inventor: Johnny Wang, No. 190, Shang-Luen Village, Jen-Teh Hsiang, Tainan Hsien, Taiwan

[21] Appl. No.: 748,535

[22] Filed: Nov. 13, 1996

[51] Int. Cl.$^6$ ..................................................... B60B 7/12
[52] U.S. Cl. ..................................... 301/37.33; 301/37.42
[58] Field of Search ................................ 301/37.1, 37.31, 301/37.32, 37.33, 37.34, 37.35, 37.36, 37.42

[56] References Cited

U.S. PATENT DOCUMENTS

| | | | |
|---|---|---|---|
| 5,011,232 | 4/1991 | Itoh et al. | 301/37.42 X |
| 5,064,249 | 11/1991 | Hung | 301/37.42 |
| 5,131,726 | 7/1992 | Collins | 301/37.42 X |

FOREIGN PATENT DOCUMENTS

| | | | |
|---|---|---|---|
| 2231201 | 9/1990 | Japan | 301/37.36 |

*Primary Examiner*—Russell D. Stormer
*Attorney, Agent, or Firm*—Morton J. Rosenberg; David I. Kleins

[57] ABSTRACT

A wheel cover adjustable in its size includes plural securing members for securing a steel bar ring. One of the securing members has a special structure for securing two ends of the steel bar ring, and a separating wall in an intermediate portion, a groove in a right side of the separating wall and a through hole communicating with the groove and opening to the right side edge, plural grooves of different length in a left side of the separating wall and plural through holes communicating with the grooves and opening to the left side edge. One end of the steel bar ring is secured in the groove and the through hole of the right side, and the other end is selectably secured in one of the grooves of different length and one of the through holes of the left side to adjust the diameter of the steel bar ring to adapt to the inner diameter of a wheel of a car.

1 Claim, 2 Drawing Sheets

5,700,062

WHEEL COVER ADJUSTABLE IN ITS SIZE

BACKGROUND OF THE INVENTION

This invention concerns a wheel cover for an automobile wheel, particularly adjustable in its size to correctly adapt to the inner diameter of a wheel.

Nowadays, most cars have a wheel cover 10 shown in FIG. 4, and the wheel cover 10 includes a plurality of securing members 101 provided with a groove 102 for a steel bar ring 20 to fit tightly in the grooves 102. The steel bar ring 20 has its two ends welded together, and the steel bar ring 20 is tightly fitted in an annular hole of a wheel so as to assemble the wheel cover with the wheel. However, the diameter of the steel ring bar ring 20 is definite, unable to be adjusted, and may not correctly fit with the diameter of the wheel, so it sometimes takes troublesome work to assemble the wheel cover 10 with the wheel with a proper tightness, causing the wheel cover to tremble or loosening off the wheel.

SUMMARY OF THE INVENTION

This invention has been devised to offer a wheel cover adjustable in its size so as to be assembled easily with a wheel of a car.

A main feature of the invention is a special securing member to secure two ends of a steel bar ring in two or more different diameter so that the steel bar ring may adapt to the inner diameter of a wheel the wheel cover is to be fixed with.

BRIEF DESCRIPTION OF DRAWINGS

This invention will be better understood by refering to the accompanying drawings, wherein.

DESCRIPTION OF THE PREFERRED EMBODIMENT

Figure 1:
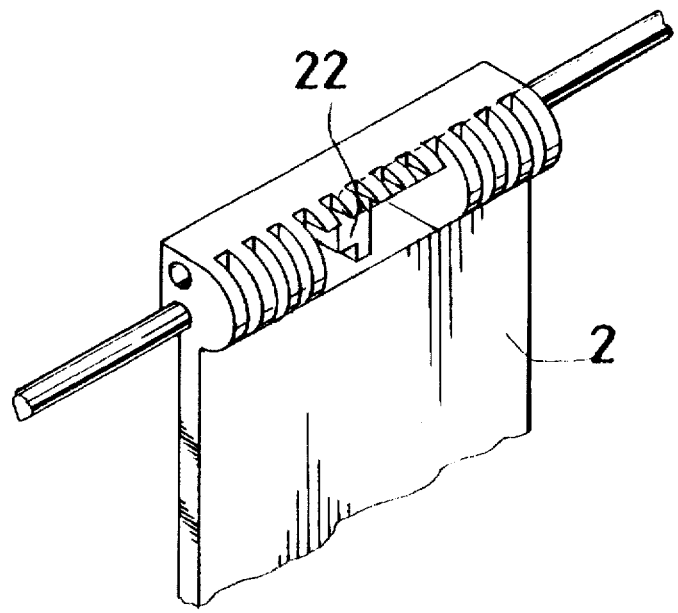
FIG. 1 is a perspective view of a securing member of a wheel cover adjustable in its size in the present invention.
Figure 2:
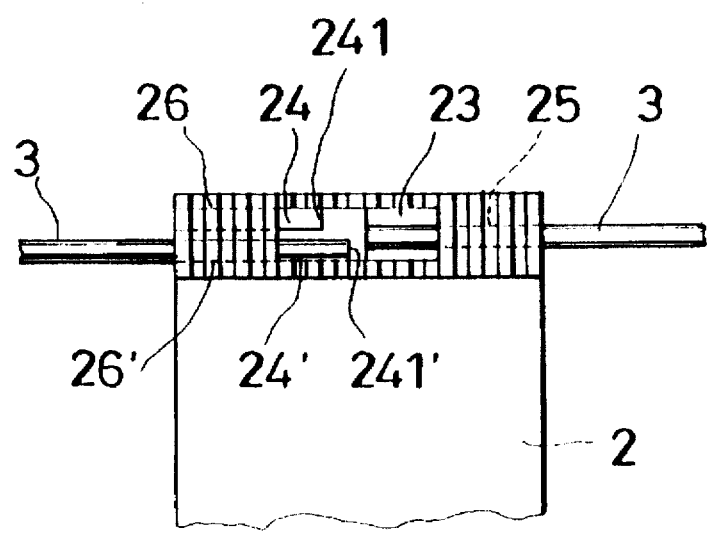
FIG. 2 is a side view of a steel bar ring connected with the securing member of a wheel cover adjustable in its size in the present invention.
Figure 3:
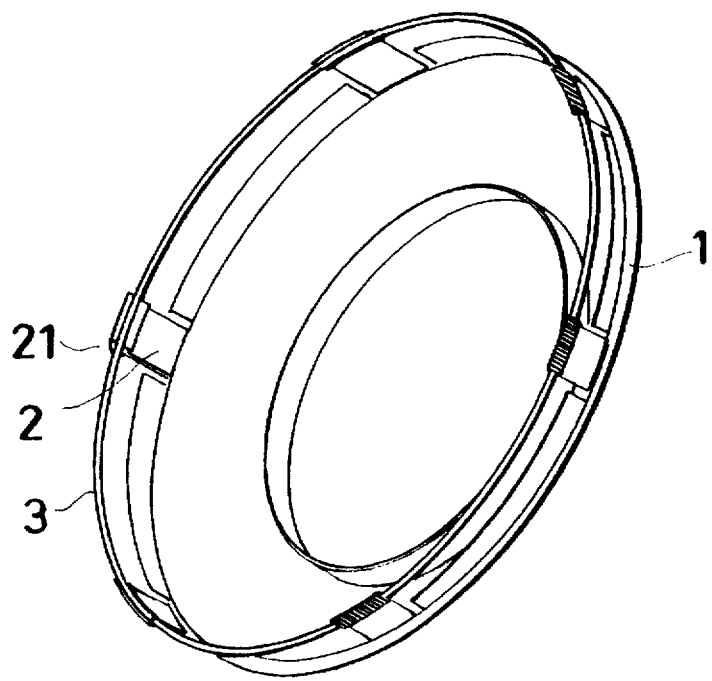
FIG. 3 is perspective view of the wheel cover adjustable in its size in the present invention, showing it fixed with the steel bar ring; and, FIG. 4 is a perspective view of a known conventional rim fixed with a steel bar ring.
Figure 4:
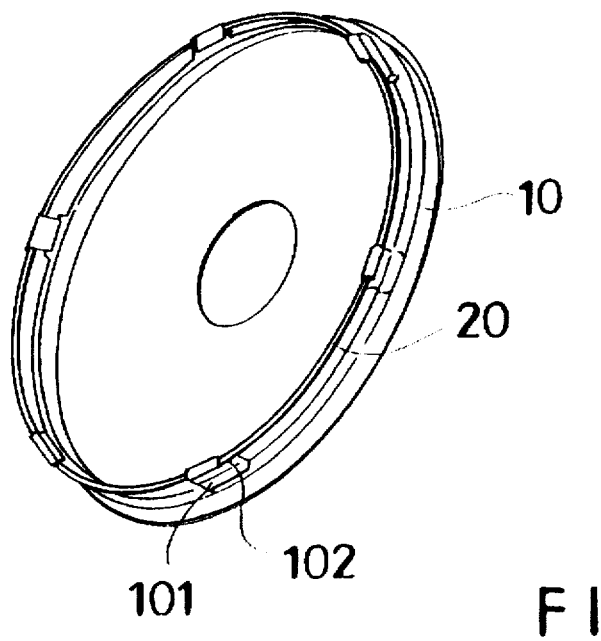

A preferred embodiment of a wheel cover 1 adjustable in its size in the present invention, as shown in FIGS. 1 and 2, includes a plurality of securing members 2 spaced apart on a periphery of the wheel cover 1. Each securing member 2 has a groove 21 for a steel bar ring 3 to fit tightly therein in the same way as the known conventional wheel cover has. But one of the securing members 2 in the present invention has a special structure including a separating wall 22 in a middle section of an upper thick end, a right groove 23 in a right side of separating wall 22, two left—an upper and a lower—grooves 24, 24' of different length in a left side of the separating means 22, a through hole 25 bored communicating with the right groove 23 and opening to the right side edge, and two—an upper and a lower through holes 26, 26' bored communicating with the left two—the upper and the lower—grooves 24 and 24' and bottom faces 241,241' formed in the two grooves 24, 24' of different length. In this example two left grooves and two through holes communicating with the holes in the left side illustrated, but more than two left grooves and two left through holes communicating with the left grooves may be used.

In assembling the steel bar ring 3 having two ends with the special securing member 2 of the wheel cover 1, one end of the ring 3 of the ring 3 is inserted through the right through hole 25 and rested in the right groove 23, and the other end of the ring 3 is inserted selectably through the left upper hole 26 or the left lower through hole 26' and rested in the left upper groove 24 or the left lower groove 24' according to the diameter of the steel bar ring 3 and contacts on one of the left upper hole bottom 241 or the left lower groove bottom 241'. Thus the diameter of the steel bar ring 3 of the wheel cover 1 can be adjusted in two or more sorts according to the inner diameter of a wheel the wheel cover 1 is to be fixed on.

The wheel cover adjustable in its size according to the present invention has advantages as follows.

1. One end of the steel bar ring having two ends can be selectably inserted in one of the left two or more through holes and one of the left grooves in the special securing member so that the diameter of the steel bar ring may be adjusted in two or more sorts to adapt to the inner diameter of a wheel the wheel cover is to be fixed on.

2. The securing members are formed integral with the outer periphery of a wheel cover, saving an extra mold for the securing members, and thus saving its cost.

3. The special securing member have a simple structure for the steel bar ring having two ends to be assembled together easily and quickly.

While the preferred embodiment of the invention has been described above, it will be recognized and understood that various modifications may be made therein and the appended claims are intended to cover all such modifications which may fall in the spirit and scope of the invention.

What is claimed is:

1. A wheel cover adjustable in its size comprising a plurality of securing members formed in a spaced equidistant position on an outer periphery of said wheel cover, each said securing member having a polygonal shape having respective left and right side edges, and an inner wall, said inner wall having an upper portion with a groove formed therein for a steel bar ring to fit tightly therein, one of said securing members having (1) an intermediate portion with a separating wall formed therein, said separating wall having respective right and left sides, (2) a groove formed in said right side of said separating wall, (3) a first through hole communicating with said groove in said right side and opening to said right side edge, (4) at least two grooves of different length formed in said left side of of said separating wall, and (5) at least two second through holes communicating with said grooves of different length in said left side of said separating wall and opening to said left side edge; said steel bar ring being elastically fitted in said grooves of said inner walls of all of said securing members except said one securing member, said steel bar ring having two ends, one of said two ends of said ring being inserted in said first through hole and rested in said groove in said right side of said one securing member for securement thereof, and the other of said two ends of said ring being selectively inserted in one of said second through holes and rested in one of said grooves of different length in said left side of said one securing member to adjust a diameter of said wheel cover.

* * * * *